United States Patent [19]
Yates et al.

[11] 3,867,657
[45] Feb. 18, 1975

[54] GENERATOR HAVING SHIELDED CURRENT TRANSFORMERS POSITIONED THEREIN

[75] Inventors: William W. Yates, Lima; Herman J. Braun, Cridersville, both of Ohio

[73] Assignee: Westinghouse Electric Corporation, Pittsburgh, Pa.

[22] Filed: Mar. 29, 1974

[21] Appl. No.: 456,424

[52] U.S. Cl. .................. 310/68 D, 310/72, 322/27, 336/84, 336/229, 336/189
[51] Int. Cl. .......................................... H02k 11/00
[58] Field of Search ............ 310/68 R, 68 D, 71, 72, 310/256, 260; 322/25, 27, DIG. 2; 336/84, 189, 190, 229

[56] References Cited
UNITED STATES PATENTS

| | | | |
|---|---|---|---|
| 2,330,991 | 10/1943 | Newton | 310/68 D X |
| 2,855,562 | 10/1958 | Hed | 322/27 X |
| 2,920,297 | 1/1960 | Spicer | 336/229 X |
| 3,114,063 | 12/1963 | Karsten | 336/84 X |
| 3,149,296 | 9/1964 | Cox | 336/84 |
| 3,448,421 | 6/1969 | Berg et al. | 336/229 X |
| 3,449,703 | 6/1969 | Steen | 336/229 X |
| 3,702,965 | 11/1972 | Drexler et al. | 310/68 D X |
| 3,713,002 | 1/1973 | Whitney | 322/27 X |
| 3,781,740 | 12/1973 | Kirmis et al. | 336/229 X |

*Primary Examiner*—Donovan F. Duggan
*Attorney, Agent, or Firm*—J. R. Hanway

[57] ABSTRACT

Electrical generator having current transformers located adjacent to the armature winding end extensions within the generator. The current transformers are surrounded by cup-shaped shields constructed of a non-magnetic, electrically conductive material. The windings of the current transformers progress alternately in different directions around a magnetic core, with the direction being reversed to prevent the formation of net winding turns around the axis of the magnetic core. The shielding and winding development of the current transformers permit their use in high AC magnetomotive force regions of the generator.

5 Claims, 6 Drawing Figures

3,867,657

GENERATOR HAVING SHIELDED CURRENT TRANSFORMERS POSITIONED THEREIN

BACKGROUND OF THE INVENTION

1. Field of the Invention:

This invention relates, in general, to electrical apparatus and, more specifically, to generators having differential protection circuits.

2. Description of the Prior Art:

Particular types of electrical generators, such as generators constructed specifically for use in aircraft electrical systems, are associated with differential protection circuits which detect internal faults within the generator. When such a fault is detected, the generator is removed from the circuit.

The differential protection circuit senses the current in both leads of the output winding, or in the leads of each phase winding in a multiple-phase generator. When the currents are not equal, the differential protection circuit recognizes that some current is flowing through the internal portions of the generator.

Current transformers are usually used to sense the current in the winding leads. Normally, the current transformers are located on the outside of the generator cover or casing where they are relatively free from the AC magnetomotive forces which are adjacent to the generator windings. However, to conserve space, it is desirable to position the current transformers within the generator casing at a location which occupies herebefore wasted space within the generator.

Conventional current transformers are not suited for placement in high AC magnetomotive force areas since these forces create leakage fluxes which induce unpredictable voltages in the current transformer windings. In a circular core current transformer, the leakage flux opposes the normal current transformer flux on one side of the core and reinforces the flux on the other side of the core. Due to the non-linear relationship between permeability and flux density, more of the leakage flux travels through the high density side of the core. The result is a net leakage flux linkage of the current transformer winding and inaccurate current transformer performance under certain conditions.

It is desirable, and it is an object of this invention, to provide a generator having one or more reliable and accurate current transformers located within the generator casing. It is desirable that such current transformers be substantially unresponsive to the high AC magnetomotive forces existing within the generator casing.

SUMMARY OF THE INVENTION

There is disclosed herein new and useful generator apparatus having current transformers located within the generator casing. The current transformers are positioned adjacent to the armature winding end extensions of the generator. A current transformer consists of a reciprocal or alternating winding in which the winding progresses in different directions around the magnetic core of the current transformer. The net number of turns progressing around the core is zero in order to prevent the induction of a voltage by the leakage flux. The current transformer is positioned in a cup-shaped shield which is constructed of a non-magnetic, electrically conductive material. Leakage flux in the region of the shield establishes eddy currents in the shield which develop magnetomotive forces oriented in a direction to counteract or prevent the leakage flux from penetrating the transformer core. Thus, the conductive shield effectively prevents leakage flux from entering the magnetic core of the current transformer.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
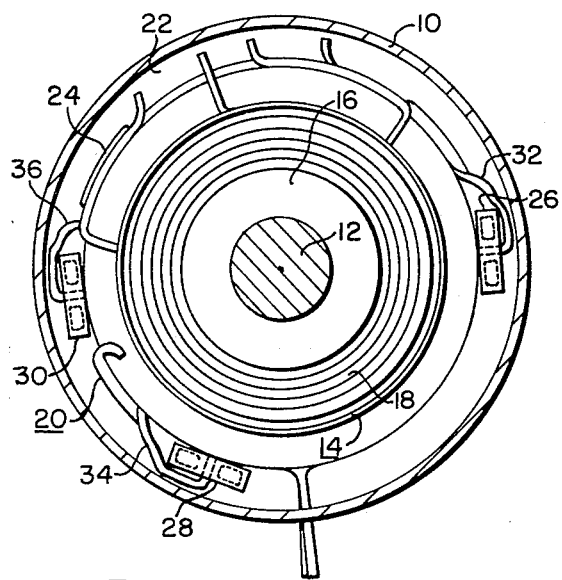
FIG. 1 is an end view of a generator constructed according to this invention.

Throughout the following description, similar reference characters refer to similar elements or members in all the figures of the drawing.

FIG. 1 is an end cross-sectional view of a generator constructed according to this invention. The generator includes the enclosure or casing 10 which surrounds the various internal components of the generator. The shaft 12 is located within the casing 10 and is attached to the rotor assembly 14 which includes the magnetic core 16 and the rotor winding structure 18. The armature or stator assembly 20 includes the magnetic core 22 and the stator winding structure 24, which are both disposed around the rotor assembly 14. The current transformers 26, 28 and 30 are positioned adjacent to the stator winding structure 24 and are positioned in such a manner that the leads 32, 34 and 36 of the stator winding structure 24 pass therethrough.

The generator illustrated in FIG. 1 is a three-phase generator having current transformers positioned within the casing 10 to measure the current flowing through one of the leads of each phase winding. It is within the contemplation of this invention that the generator may be a single-phase generator or a multiple-phase generator having more or less than three phases. Various bearing surfaces, exciting generators, and lubricating apparatus may be attached to the shaft 12, but are not illustrated in FIG. 1 in the interest of clarity.

Figure 2:
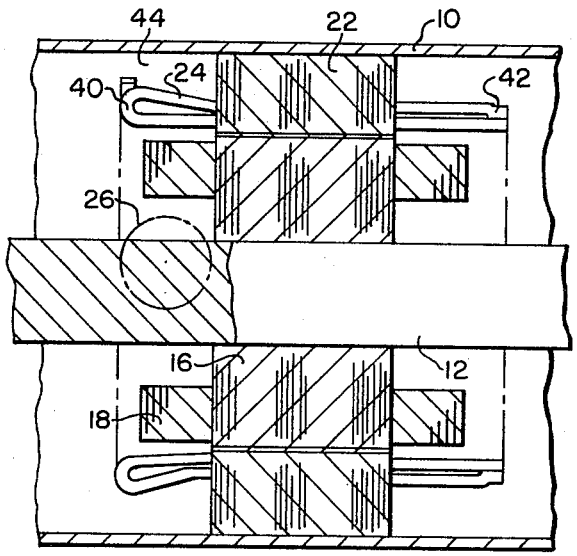
FIG. 2 is a side view of a generator constructed according to this invention.

FIG. 2 is a side cross-sectional view of the generator shown in FIG. 1. The stator or armature winding structure 24 includes the winding end extensions 40 and 42 which extend from the magnetic core 22. The space 44 located between the winding end extension 40 and the casing 10 is normally wasted space in such a generator. By placing the current transformers, such as the current transformer 26 which is shown in phantom in FIG. 2, in the space 44, the effective space occupied by the differential protection system is significantly reduced. The current transformer 26 is adjacent to the winding end extension 40 and is secured thereto by a suitable connecting arrangement, such as lacing the current transformer 26 to the conductors of the winding structure 24 with suitable insulating material.

Figure 3:
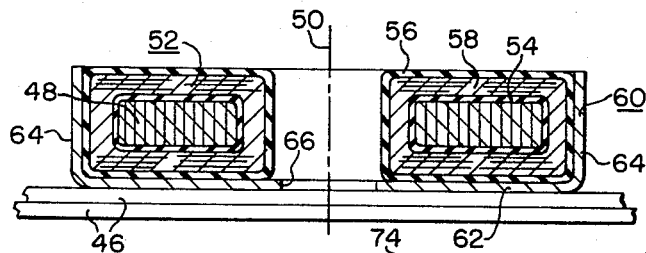
FIG. 3 is a cross-sectional view of a current transformer constructed according to one embodiment of this invention.

FIG. 3 is a cross-sectional view of a current transformer constructed according to this invention. The current transformer is positioned adjacent to the conductors 46 which are part of the stator winding structure 24. The current transformer includes, in this specific embodiment, a circular magnetic core 48 which is positioned with its axis 50 perpendicular to the cylindrical surface defined by the stator winding structure 24. The magnetic core 48 is encircled by a winding structure 52 which is shown schematically in FIG. 3 as consisting of insulating layers 54 and 56, and a conducting layer 58. Generally, the winding structure 52 consists of a plurality of turns of an insulated electrical conductor.

The core and winding assembly of the current transformer is positioned in a cup-shaped shield 60 which is constructed of a non-magnetic, electrically conductive material such as copper. The shield includes the bottom portion 62 which is positioned adjacent to the conductors 46, and the side portions 64 which extend upwardly from the bottom portion 62 to a height substantially equal to the height of the core and winding assembly. The opening 66 in the bottom portion 62 of the shield 60 has a sufficient size to permit the extension therethrough of the winding lead through which the monitored current flows. In general, the size of the opening 66 should be kept as small as practicable.

The shield 60 is constructed of an electrically conductive material for the purpose of permitting the development of eddy currents in the shield due to the leakage flux in the area of the winding structure 24. The eddy currents induced by the leakage flux develop an opposing magneto-motive force which effectively cancels or counteracts the leakage flux entering the shield 60. Thus, the net flux traveling through a sufficiently thick flux shield 60 is substantially reduced. The thickness of the shield 60 is dependent upon the amount of flux cancellation desired, the amount of leakage flux existing in the region, and upon other factors of the generator and current transformer. Suitable values for a copper shield have been found to exist within the range between 1/32 of an inch and 4/32 of an inch.

Figure 4:
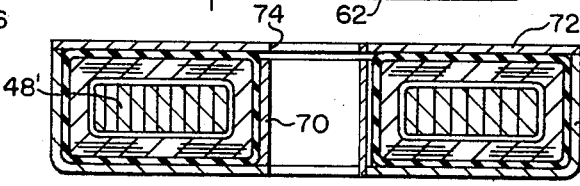
FIG. 4 is a cross-sectional view of a current transformer constructed according to another embodiment of this invention.

FIG. 4 is a cross-sectional view of a current transformer constructed according to another embodiment of this invention. In this embodiment, the cup-shaped shield 60' includes the cylindrical center portion 70 and the cup cover 72 which contains the opening 74. The three members of the shield 60' are similarly constructed of a non-magnetic, electrically conductive material and completely enclose the core and winding structure of the current transformer. A gap is provided between the cup cover or top portion 72 and the cylindrical center portion 70 to prevent the formation of a shorted turn around the core 48' of the current transformer.

Figure 5:
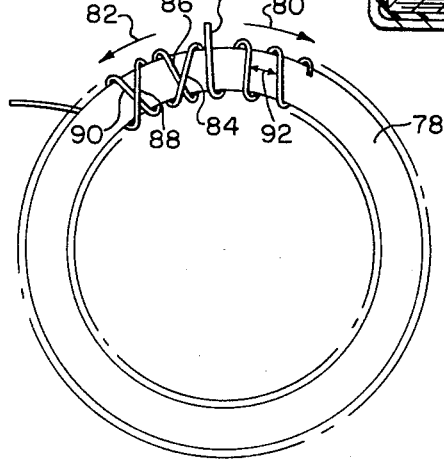
FIG. 5 is a diagram illustrating the winding progression around the core of the current transformer; and, FIG. 6 is a diagram illustrating schematically the alternating winding arrangement shown in FIG. 5.

FIG. 5 indicates the winding development of the core and winding structure of a current transformer constructed according to this invention. An insulated conductor 76 is wound around a magnetic core 78 as illustrated and first progresses in the direction indicated by the arrow 80. As the winding progresses around the magnetic core 78 to approximately the place of beginning, the direction of progression of the winding is reversed and assumes the direction indicated by the arrow 82. Thus, the illustrated portion of the turn 84 overlaps the illustrated portion of the turn 86, the illustrated portion of the turn 88 overlaps the illustrated portion of the turn 90, and so on until the winding again reaches the place of beginning. At that position, the winding development is reversed and the winding progresses again in the direction indicated by the arrow 80. The spacing 92 between adjacent winding turns may be much smaller than that indicated in FIG. 5. Thus, as the direction of progression of the winding reverses, a new layer is wound around the magnetic core 78 instead of being interwoven with previously wound turns. In any event, the direction of progression of the turns around the magnetic core 78 is reversed enough times to provide a zero net number of turns progressing around the axis of the magnetic core, which in FIG. 5 is in the center of the core 78 and perpendicular to the plane of the figure.

Although illustrated and described thus far by an arrangement whereby the winding progression is reversed during each circling of the magnetic core 78, it is within the contemplation of this invention that the winding progression may maintain the same direction for a number of revolutions around the axis of the magnetic core 78 before reversing and progressing in the opposite direction for the same number of revolutions.

Figure 6:
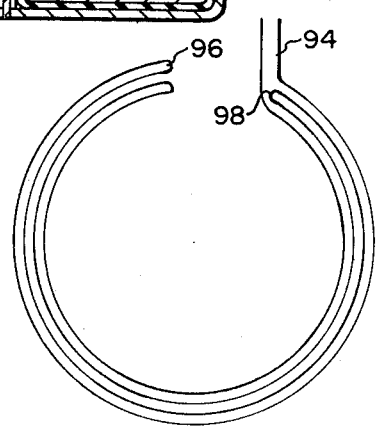

FIG. 6 is a schematic representation of a winding structure developed according to the principle illustrated in FIG. 5. The conductor 94 progresses around to the position 96 where the direction of progression is reversed. From position 96, the conductor 94 progresses in the opposite direction to the position 98. After two more reversals of progression, the conductor 94 has formed four electrical paths around the axis of the magnetic core upon which it is wound. However, due to the changes in direction, two of the four conduction paths may be induced with a voltage having one polarity, and the other two conduction paths may be induced with a voltage having the opposite polarity. Since the four conduction paths are effectively connected in series circuit relationship, the net result of the induced voltages therein is zero. Thus, a current transformer constructed according to this arrangement is substantially immune to the effects of leakage flux going through the middle of the core.

It has been found that the unwanted voltages induced into a current transformer may be reduced if the current sensed by the current transformer is not in time phase with the current in the generator winding structure which is adjacent to the current transformer. Thus, an improvement in current transformer performance can be achieved by positioning the current transformer adjacent to a stator phase winding other than the one from which the lead extending through the current transformer originates. For example, in FIG. 1 the current transformer 32 may be positioned adjacent to a phase winding of the stator winding structure 24 other than the phase winding to which the lead 32 is connected.

An additional advantage to a generator constructed according to this invention may be realized when the generator is suitable for three-phase operation with "star" connected leads. With such a connection, it is unnecessary to bring the neutral leads of the three phase windings to the outside of the casing of the generator. Normally, this has been required in differentially protected generators since it is required that the neutral leads have a current transformer coupled thereto. Thus, with a generator constructed according to this invention, at least three winding leads and their associated terminals can be maintained within the casing of the generator.

Since numerous changes may be made in the above described apparatus, and since different embodiments of the invention may be made without departing from the spirit thereof, it is intended that all of the matter contained in the foregoing description, or shown in the accompanying drawings, shall be interpreted as illustrative rather than limiting.

We claim as our invention:

1. An electromechanical generator comprising:
   a rotor;
   a stator assembly having a magnetic core and a winding structure extending from said magnetic core, said stator assembly being disposed around said rotor;
   a flux shield constructed of a non-magnetic, electrically conductive material, said flux shield having a bottom portion and side portions extending from said bottom portion, said flux shield being disposed substantially adjacent to the winding structure which extends from said magnetic core; and,
   a closed magnetic core with a layered winding disposed thereon, said closed magnetic core and layered winding structure being positioned between the sides of said flux shield, with substantially one-half of the layers of the layered winding progressing in one direction and the other layers progressing in the opposite direction for providing a winding which does not have any net turns which would be linked by magnetic flux which is directed perpendicular to the bottom portion of the flux shield;
   said bottom portion of said flux shield having an opening therein through which a lead from said stator winding structure extends to provide inductive coupling between the lead and the layered winding on the closed magnetic core.

2. The electromechanical generator of claim 1 wherein the bottom portion of the flux shield is aligned in such a manner that the plane generally containing said bottom portion is tangent to a cylindrical surface defined generally by the stator winding structure.

3. The electromechanical generator of claim 1 wherein the flux shield includes a top member constructed of a non-magnetic, electrically conductive material and having an opening therein, said top member being positioned parallel to the bottom portion of the flux shield and substantially across the ends of the side portions to substantially enclose the core and winding structure, and a cylindrical member constructed of a non-magnetic, electrically conductive material and positioned with an opening therethrough adjacent to the openings in the top member and the bottom portion of the flux shield.

4. A three-phase generator comprising:
   a rotor assembly;
   a stator assembly having a magnetic core and a three-phase winding structure having three phase windings which at least partially extend from said magnetic core, said stator assembly being disposed around said rotor assembly;
   at least one cup-shaped flux shield constructed of a non-magnetic, electrically conductive material, said flux shield having a bottom portion with an opening therein and side portions extending from said bottom portion, said flux shield being disposed substantially adjacent to the extended portion of a phase winding; and,
   a closed magnetic core having a winding disposed thereon, said closed magnetic core and winding structure being positioned between the sides of said flux shield, with the winding changing its direction of progression a sufficient number of times around the magnetic core to provide a winding which does not have any net turns which would be linked by magnetic flux which is directed perpendicular to the bottom portion of the flux shield;
   said bottom portion of said flux shield having an opening therein through which a lead from a phase winding extends to provide inductive coupling between the lead and the winding on the closed magnetic core.

5. The three-phase generator of claim 4 wherein the lead which extends through the opening in the bottom portion of the flux shield primarily carries current from a phase winding other than the one to which the flux shield is disposed substantially adjacent.

* * * * *